United States Patent [19]
Vurek

[11] 3,799,672
[45] Mar. 26, 1974

[54] OXIMETER FOR MONITORING OXYGEN SATURATION IN BLOOD

[75] Inventor: Gerald G. Vurek, Bethesda, Md.

[73] Assignee: The United States of America as represented by the Secretary of the Department of Health, Education and Welfare, Washington, D.C.

[22] Filed: Sept. 15, 1972

[21] Appl. No.: 289,287

[52] U.S. Cl............ 356/41, 250/218, 356/88, 356/97
[51] Int. Cl.............. G01n 33/16, G01j 3/42
[58] Field of Search............ 356/39, 41, 87, 88, 93, 356/95, 97; 250/218

[56] References Cited
UNITED STATES PATENTS
3,638,640  2/1972  Shaw .................................... 356/41
3,522,739  8/1970  Coor et al. ........................... 356/41
3,645,629  2/1972  Dagnall ................................ 356/87
3,527,542  9/1970  Penhasi et al. ...................... 356/39
3,588,253  6/1971  Wittmann ............................. 356/95

*Primary Examiner*—John K. Corbin
*Assistant Examiner*—V. P. McGraw

[57] ABSTRACT

A device for monitoring blood oxygen saturation during extracorporeal bypass procedures comprises a dual wavelength oximeter utilizing an infrared (905 nm) light-emitting diode and a visible red (655nm) light emitting diode to alternately illuminate blood as it flows through a plastic cuvet. The ratio of the infrared signal to the red signal received by a phototransistor is computed by a simple electro-optical feedback circuit, the ratio being linearly related to blood oxygen saturation over the range extending from 100 percent to below 40 percent.

10 Claims, 9 Drawing Figures

IR LED (a)

VISIBLE LED (b)

OXIMETER FOR MONITORING OXYGEN SATURATION IN BLOOD

FIELD OF INVENTION

The present invention relates essentially to measuring blood oxygen saturation content, and more particularly to an oximeter for measuring blood oxygen saturation which alternately shines light of two different wavelengths through the blood, and computes the ratio of the two diffusely-transmitted light signals as an indication of the saturation.

BACKGROUND

Cardiopulmonary bypass has been employed for many years in open heart surgery, and recent advances in oxygenator technology have made it feasible to apply extracorporeal circulation for extended periods. Instrumentation is needed to assess the status of the patient and performance of the oxygenators during these prolonged procedures since repeated sample withdrawal for discrete measurements aggrevate blood loss and increase the hazard of infection. Because blood oxygen saturation can be measured optically, it is suited to long-term non-invasive monitoring as well as during shorter open-heart procedures. Thus, an oximeter can provide data on demand and no samples need be withdrawn from the circulation.

Optical oximetry has been developed gradually over the past half century, but the majority of the prior art devices have been inadequate, inaccurate, and cumbersome with many large components, so that they have left much to be desired. These early devices have been largely ineffective because they generally utilize only a single beam of light, and are basically merely analyzers for testing fluids.

Furthermore, the method of computing ratios, or percentage of saturation, when using such prior devices, has left much to be desired since these early ratio schemes frequently require mechanical or optical wedges to compensate for transmitted signals of fixed intensity sources.

Other prior devices have indicated saturation according to a precalibrated scale relying on the stability of the optical system to retain the proper relation between saturation and indication. Also, even if two wavelengths of light were used, generally two separate detectors were employed and this opened the door for unbalance and discrepancy.

SUMMARY

The present invention provides considerable advancement in the art of oximeters and overcomes the shortcomings and inadequacies of similar prior art devices by the provision of an electronic circuit for measuring the ratio of two optical signals, originally conceived to compute blood oxygen saturation, but also applicable to other photometric procedures requiring the ratio of two optical signals. The concept of the invention is the use of a controllable light source, together with a high gain difference amplifier to generate a reciprocal function. The scheme exploits the availability of solid state light emitting diodes of the gallium-arsenide-phosphide type whose output light is directly and linearly related to input current. The use of a common detector for both light signals and the use of similar light sources as far as electrical and thermal characteristics are concerned, makes the system reasonably immune to drift, thermal changes, and component aging.

The oximeter of the present invention has the following features: it indicates saturation within plus or minus three percentage units over the range of 40 to 100 percent saturation; it goes not obstruct the blood flow, the blood easily passing through an extracorporeal circuit made of 9 mm I. D. (⅜ inch) tubing; the blood contacts only materials of demonstrated bio-compatibility; removal or installation of the oximeter can be accomplished without interrupting the blood circuit; calibration or standardization checks can be performed without interrupting the blood circuit, and the device is compact, unobtrusive, and inexpensive.

It is accordingly, an object of the present invention to overcome the defects of the prior art.

It is another object of the present invention, to provide for improved blood oxygen measuring.

An object of the present invention is the provision of an oximeter for monitoring blood oxygen saturation, and having the above features.

Another object is the provision of an oximeter which employs light beams of two different wavelengths.

Still another object is the provision of an oximeter which derives the ratio by using current controlled sources in the circuit which makes the ratio computation largely independent of changes in the power supply.

Yet another object is the provision of an oximeter which has the advantage that the signal for the denominator term is maintained at a high level so that a good signal-to-noise ratio is maintained even at low saturation levels.

Another object is the provision of an oximeter which uses a controllable light source together with a high gain difference amplifier to generate a reciprocal function.

Other objects and many of the attendant advantages of this invention will be readily appreciated as the same becomes better understood by reference to the following detailed description of an embodiment, when considered in connection with the accompanying drawing in which like reference numerals designate like parts throughout the figures thereof and wherein:

DETAILED DESCRIPTION OF EMBODIMENT

Figure 1:
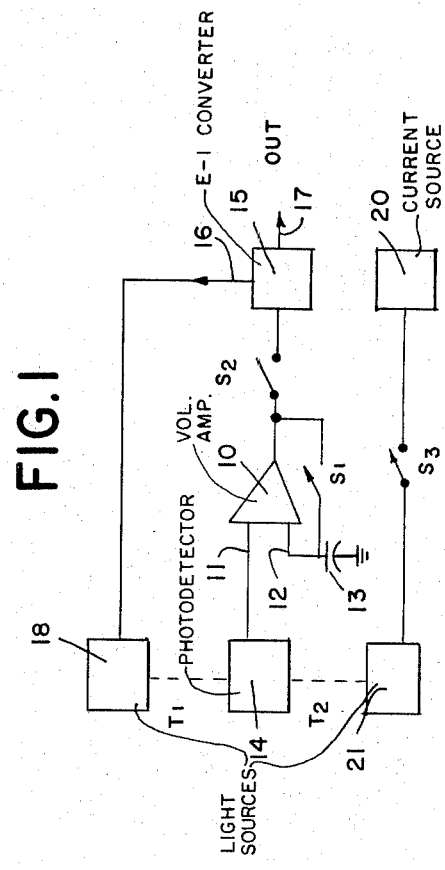
FIG. 1 is a schematic broad block diagram of an embodiment.

FIG. 1, which depicts a broad block diagram of the invention, shows a voltage amplifier 10 for amplifying 1,000 or more times the difference between its two input terminals 11 and 12. Connected between the input terminal 12 and ground there is a storage device 13, such as a capacitor with low electrical leakage, while a switch S1 connects the output of the amplifier 10 with its input 12. A photodetector 14 has its output connected to the input 11 of the amplifier 10, the detector 14 producing an output voltage proportional to the incident light flux falling on it. The output from the amplifier 10 passes through a switch S2 before being applied as an input to a voltage-to-current converter 15, the converter having two outputs 16 and 17, from the first of which flows a current proportional to its input voltage, and from the other of which appears a voltage proportional to that current.

A first light source 18, of the gallium-arsenide-phosphide type, produces an output light of about 655 nm wavelength which is proportional to the current from converter 15, via output 16, and this output light travels over an optical transmission path T1 to illuminate photo detector 14.

A switch S3 is connected between a separate source of power 20 and a second source of light 21, also of the gallium-arsenide-phosphide type, light source 21 producing an output which has a wavelength of 905 nm and which is proportional to the current flow from source 20 when switch S3 passes current, and no light when switch S3 passes no current. The output light from second source 21 travels over an optical path T2 to also illuminate the photodetector 14.

The operation of the device is repetitive and cyclic. First, switches S1 and S3 are closed and S2 is open. Light source 21 is energized from power source 20 and its light output reaches photodetector 14 via optical path T2. Because of the difference amplifying nature of amplifier 10, and the signal path through S1 to storage device 13 and input terminal 12 of amplifier 10, at least 0.999 of the signal from detector 14, due to light source 21 and optical path T2, will be put into storage device 13. Next, S1 opens and S3 opens so that light source 21 goes off, and the signal from light source 21 via optical path T2 is maintained at amplifier 10, input 12, by means of storage device 13. S2 closes and the output of the amplifier 10 is applied to voltage-to-current converter 15 which causes the light source 18 to be energized. The intensity of light source 18 is forced to make the signal, via optical path T1, and received at detector 14 very nearly equal to the signal stored on the storage device 13. The greater the optical absorption in the path T1, the greater light from source 18 must be energized in order to make the signal at the detector 14 the same as that due to light source 21 in the preceding half cycle. As long as the amplification of amplifier 10 is sufficiently large than the signal out of the converter 15 will be proportional to the ratio of T2/T1.

Figure 2:
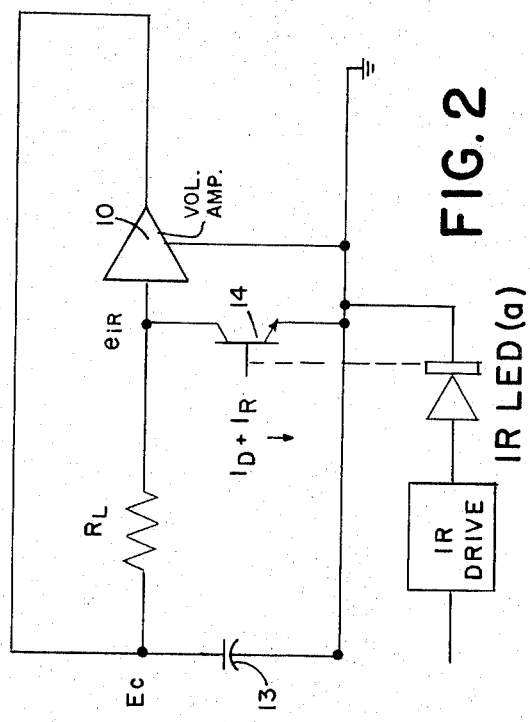
FIG. 2 is a block diagram of the circuit during the infrared part of the measurement cycle.

Turning now to FIG. 2 of the drawings there is shown a block diagram of the oximeter circuit during the infrared half cycle. Here Id plus Ir is the current through the phototransistor 14 due to the infrared signal and the dark current.

Figure 3:
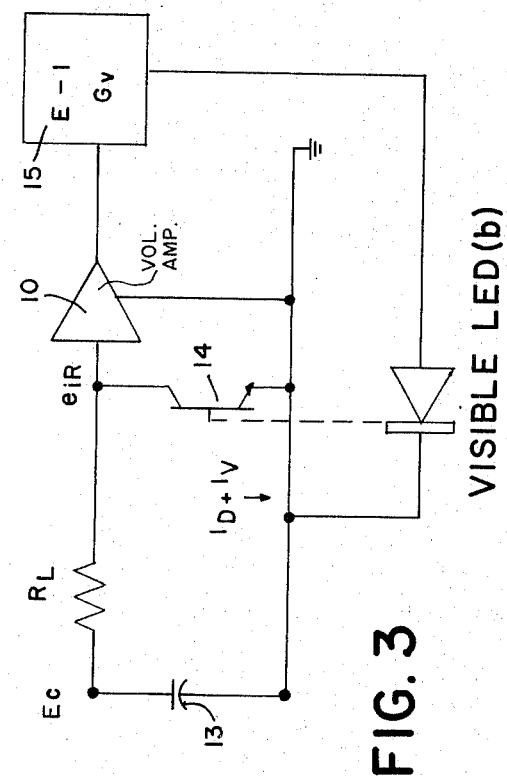
FIG. 3 is a block diagram of the circuit during the visible red part of the measurement cycle.

In FIG. 3 of the drawings there is shown a block diagram of the oximeter circuit during the visible red half cycle, and in this case Id plus Iv is the current through the phototransistor 14 due to the visible red signal and the dark current. Gv is the transconductance of the voltage-to-current converter 15.

Figure 4:
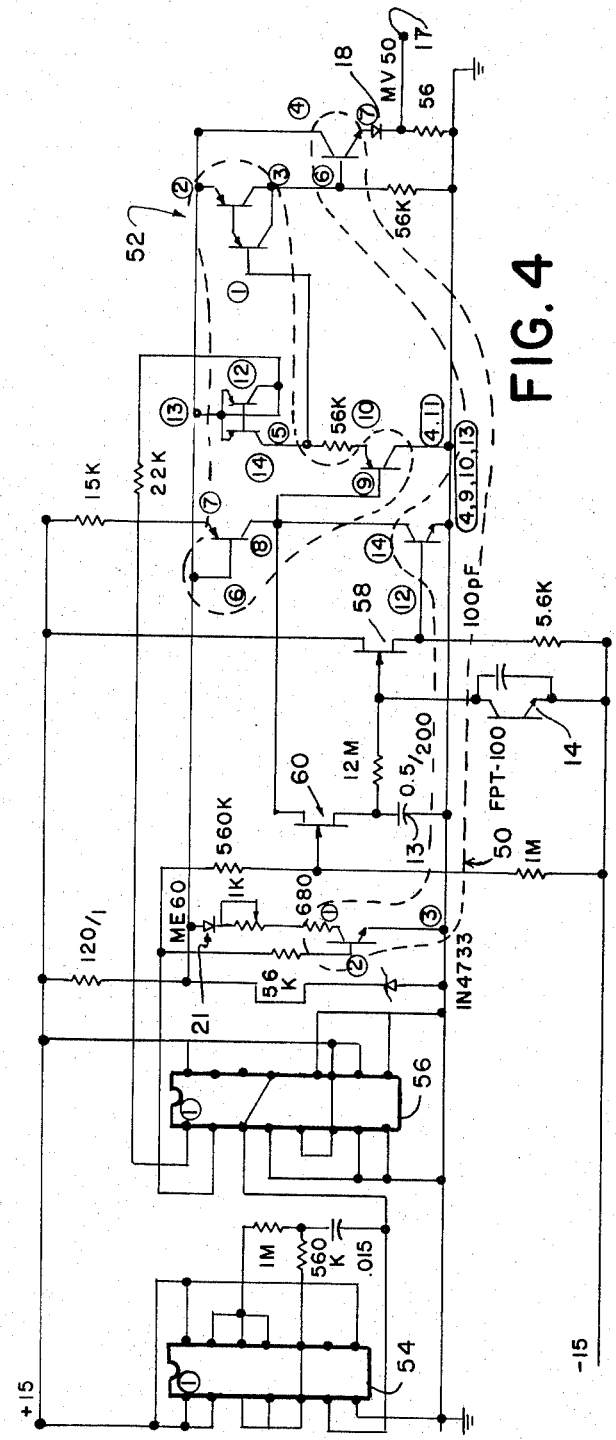
FIG. 4 shows the electronic circuit of the oximeter.

FIG. 4 shows the circuit of the invention. The clock which provides the signals for switching the circuit between the visible and infrared portions of the measurement cycle consists of a free-running multivibrator driving a J-K flip-flop, the output of which is symmetrical rectangular signal at about 40 Hz. The item 54 is a CA4025 AE integrated circuit containing three COS/MOS NAND-gates; the encircled 1 indicates terminal No. 1 on the integrated circuit and the other 13 terminals are indicated by dots in systematic order. The item 56 is a CD4027 AE integrated circuit containing two COS/MOS J-K flip-flops with terminals indicated in similar fashion. The three NPN transistors enclosed within dashed lines 50 are part of a set of five transistors in one integrated circuit package, type CA 3046 or CA 3086. The PNP transistors enclosed within dashed lines 52 are a set of transistors in one integrated circuit package, type CA 3084. All encircled numbers refer to the connections on the integrated circuit; the integrated circuits are manufactured by RCA. The amplifier, which has a gain of a few hundred, is made up of a 2N4221 source-follower 58 and an NPN common-emitter stage rising a PNP transistor connected to a current source as a load. The output of the amplifier goes to a 2N4220 switching transistor 60 and to a PNP emitter-follower. During the infrared half-cycle, the switching transistor 60 passes the amplified signal to the storage capacitor 13 and the diode-connected PNP elements, terminals 5, 12, 13, 14 in the PNP package, prevent the signal from reaching the current drive for the visible red emitting diode 21. The NPN transistor, terminals 1, 2, 3, energizes the infrared emitting diode (e.g. Monsanto ME-60) through an adjustable resistor which provides a way to adjust the current until an adequate signal appears at the phototransistor 14. During the visible red half-cycle, the switching transistor 60 prevents the amplified signal from reaching the storage capacitor 13 and the PNP diode elements permit the signal to reach the visible emitting diode 18 (e.g. Monsanto MV-50). The output signal appears across the 56 ohm resistor to output 17. Because the optical path through the blood is relatively short (a few mm), the currents through the light emitting diode are small, typically 4 MA for the infrared (21), and 4-to-20 MA for the red (18).

Figure 6:
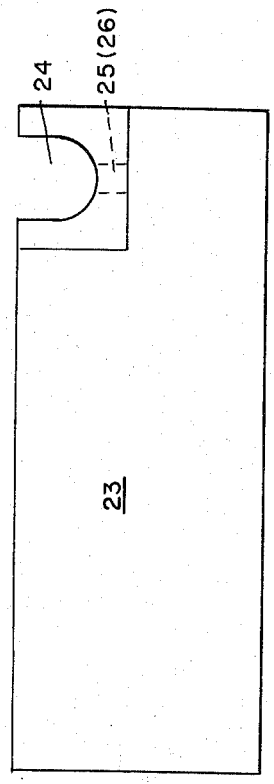
FIG. 6 is an elevation view of the measuring head of FIG. 5.
Figure 5:
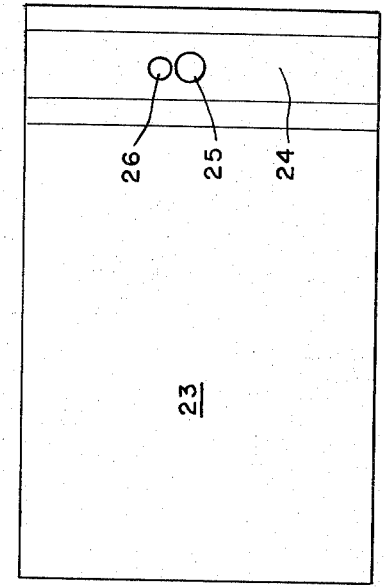
FIG. 5 is a plan view of one of the measuring heads.

User considerations suggested that the cuvet, or blood-carrying tube, fit snugly into a U-shaped slot, better shown in FIGS. 5 and 6. This arrangement allows installation or removal of the oximeter head without disturbing the blood circuit. Experience indicated that freedom from hematocrit error is obtained when the optical paths for the red and infrared signals are as identical as possible. The LED's should be placed close to the photodetector to obtain adequate signal. FIGS. 5 and 6 show the layout and principal dimensions of the head. A block of aluminum 23 has a U-shaped slot 24 cut in one of its ends, the slot 24 being of the precise dimension to accommodate a cuvet. Holes 25 are provided for the phototransistor 14, and holes 26 are provided for the light emitting diodes LED's 18 and 21, through the bottom of slots 24. Clear epoxy, conforming to the U-shaped slot 24, holds the phototransistor 14 and LED's 18 and 21 in place. As an alternative, the LED hole of the rear of the slot may be enlarged so that both LED's can be put side by side, the axis through their centers being normal to the axis of the slot. The epoxy improves thermal contact and temperature tracking of the LED's. Not shown in the drawing are the hinged lid and snap that covers the cuvet and holds it in position.

Figure 7:
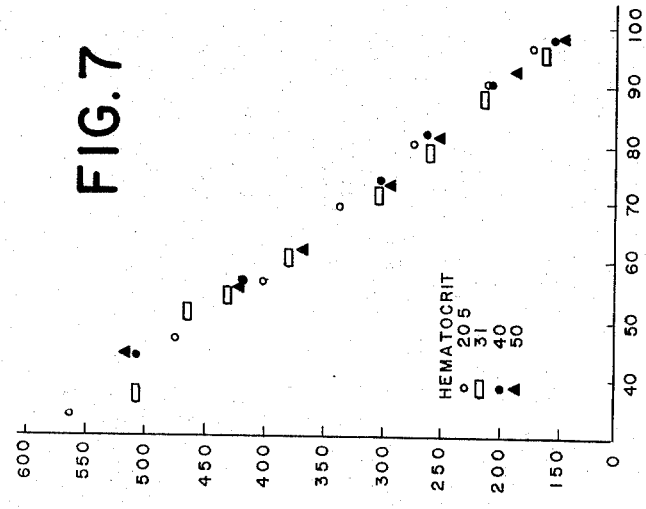
FIG. 7 is a graph of the plotted results for various hematocrits.

In FIG. 7 there is shown a plot of the average voltage output of the circuit of FIG. 4 as a function of saturation, at various hematocrits.

Figure 8:
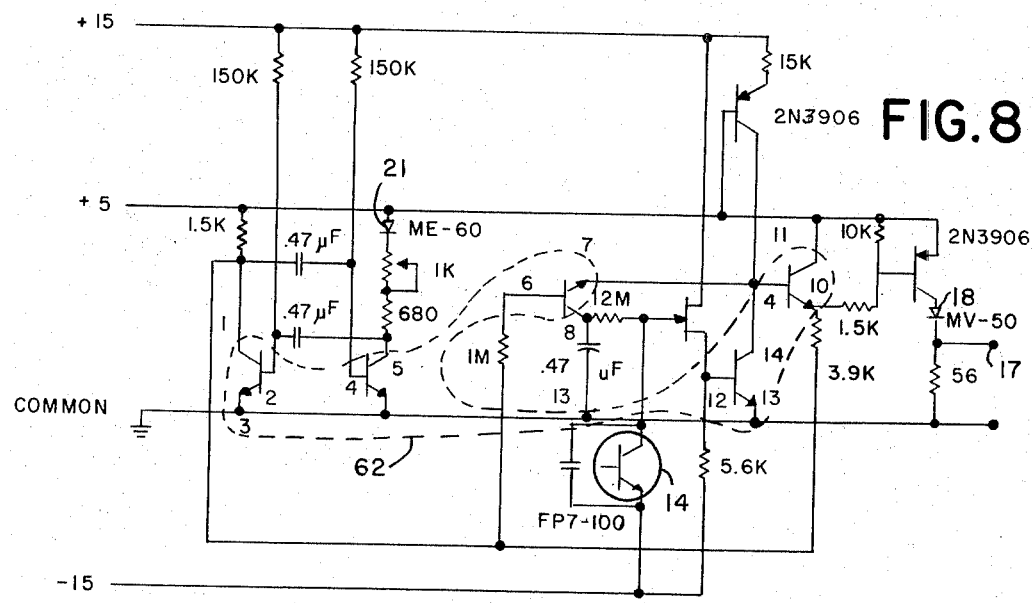
FIG. 8 shows a circuit diagram of an alternate embodiment of the present invention.

In FIG. 8 is shown a schematic of another circuit which can be used to embody the invention. The NPN transistors are part of an integrated circuit array (RCA No. CA 3046 or CA 3086 enclosed in dashed line 62, the terminals of which are indicated by the encircled numbers. A part of NPN transistors are connected as a free-running multivibrator, half of which also is the switching element (SE of FIG. 1) for the infrared diode 21. An NPN transistor (terminals 6, 7, 8) is used as the switching element corresponding to S1 in FIG. 1. An NPN transistor (terminals 9, 10, 11) is used as the switching element corresponding to S2 in FIG. 1 A PNP transistor acts as the load resistor as in FIG. 4, and another PNP transistor acts as the controllable current source fr the visible emitting diode 18.

Figure 9:
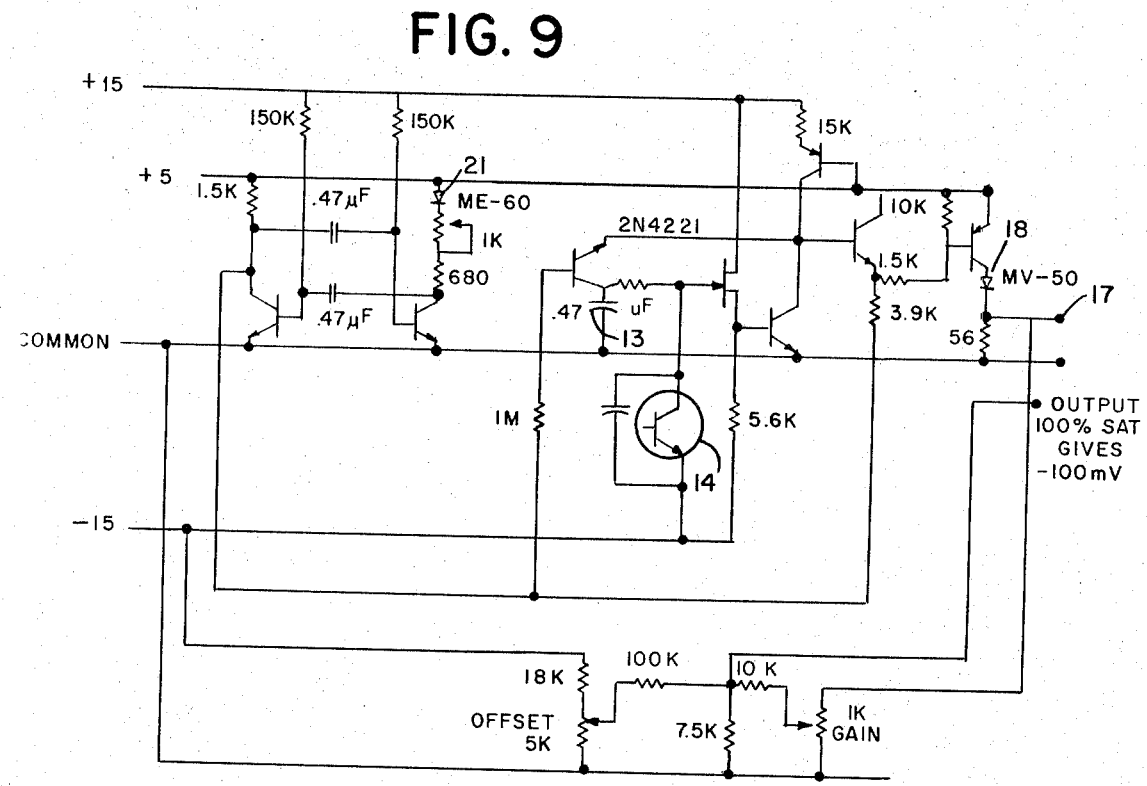
FIG. 9 shows a circuit diagram of another alternate embodiment.

In FIG. 9 is shown a schematic of another embodiment of the patent. Discrete transistors are used instead of integrated circuits. All NPN transistors may be type 2N3711 and all PNP transistors are 2N3906. In addition, two adjustable potentiometers and four fixed resistors are connected to provide a second output so that 100 percent saturated blood yields a $-100$ MV signal and 50 percent saturated blood yields a $-50$ MV signal.

As a review of the operating principle of the invention it should be noted that the ratio of the reflectance or transmittance of whole blood at two wavelengths, usually one near 805 nm and one near 655 nm, is related to the blood oxygen saturation. Oxy- and deoxy=hemoglobin have the same extinction coefficient near 805 nm but the extinction coefficient of oxyhemoglobin is much less than deoxyhemoglobin near 655 nm. Changes in blood erthrocyte concentration affect each signal similarly so that hematocrit changes do not greatly influence the ratio, and measurement of saturation can be made with reasonable independence from hematocrit fluctuations. Wavelengths other than 805nm can be used but the numerator of the ratio becomes sensitive to saturation as well as hematocrit. When one uses a 905 nm, available from inexpensive light emitting diodes (LEDs), the ratio is slightly greater than obtained at 805 nm because the 905 nm signal absorption increases with saturation whereas it decreases at 655 nm. When the intensity of the light sources at each wavelength is constant, the signal at 655 nm falls with saturation, reducing the signal-to-noise ratio, therefore the circuit of the invention maintains the red signal equal to the infrared signal. The output of the circuit is then directly proportional to the ratio of infrared-to-red signals and to saturation.

From the above description of the structure and operation of the present invention it is obvious that the device offers many improvements over the weaknesses and short-comings of prior art oximeters as would be used to measure the percentage ratio of oxygen saturation in the blood. The invention employs two controlled light sources, of different wavelengths, to illuminate blood as it flows through a plastic cuvet, and then an electric circuit measures the ratio of these two optical signals to accurately determine the oxygen content of the blood.

Obviously, many modifications and variations of the present invention are possible in the light of the above teachings. It is therefore to be understood, that within the scope of the appended claims, the invention may be practiced otherwise than as specifically described.

What is claimed is:

1. An oximeter for measuring oxygen content in the blood comprising:
   a first controllable source of light;
   a second controllable source of light;
   light sensitive means located so as to be illuminated by the first and second source of light;
   means for placing a blood sample in the optical paths between the two light sources and the light sensitive means so that light from said sources illuminates the blood;
   means for alternately energizing the light sources such that the output of the second source of light is controlled by and proportional to the optical signal of the first source of light; and
   means for determining the ratio of the signals received by the light sensitive means from the two light sources.

2. The oximeter of claim 1 wherein the output light from each light source is directly and linearly related to its input current.

3. The oximeter of claim 2 wherein the first and second light sources operate at different wavelengths.

4. The oximeter of claim 3 wherein the first light source has a wavelength of about 655 nm.

5. The oximeter of claim 4 wherein the second light source has a wavelength of about 905 nm.

6. The oximeter of claim 5 wherein the light sensitive means is a phototransistor.

7. The oximeter of claim 6 wherein the means for holding the blood sample is a U-shaped slot with light channels in the bottom of the slot.

8. The oximeter of claim 7 wherein the means for alternately energizing the light sources comprises electronic switches.

9. The oximeter of claim 8 wherein the means for determining the ratio between the two optical signals is a high gain difference amplifier.

10. An oximeter for measuring oxygen saturation of the blood comprising
    two light sources operating at different wavelengths and having their output light directly and linearly related to their input currents;
    a common light detector to receive light from both sources;
    means for placing the blood to be measured in the optical paths of both light sources so that the blood is illuminated by the light sources and the scattered light from the blood falls on the light detector;
    a high gain difference amplifier connected to the output of the detector;
    switching means for alternately energizing the light sources;
    a voltage to current converter connected to the output of the difference amplifier;
    voltage storage means connected to the output of the difference amplifier to store the output signal from the detector when the first light source is energized;
    means for applying the voltage on the storage means to the input of the difference amplifier; and
    means for applying the output of the converter to the second light source whereby the output of this second light source is proportional to the output from the converter and therefore the optical signal from the first light source.

* * * * *